June 13, 1961 D. L. BONHAM 2,988,706

VIBRATO CIRCUIT COMPRISING A BRIDGE HAVING NON-LINEAR IMPEDANCE ELEMENTS

Filed Oct. 29, 1958 2 Sheets-Sheet 1

INVENTOR
DON L. BONHAM

BY HIS ATTORNEYS
HARRIS, KIECH, FOSTER & HARRIS

June 13, 1961 D. L. BONHAM 2,988,706

VIBRATO CIRCUIT COMPRISING A BRIDGE HAVING NON-LINEAR IMPEDANCE ELEMENTS

Filed Oct. 29, 1958

2 Sheets-Sheet 2

INVENTOR
DON L. BONHAM

BY HIS ATTORNEYS
HARRIS, KIECH, FOSTER & HARRIS

United States Patent Office 2,988,706
Patented June 13, 1961

2,988,706

VIBRATO CIRCUIT COMPRISING A BRIDGE HAVING NON-LINEAR IMPEDANCE ELEMENTS

Don L. Bonham, 19006 Wells Drive, Tarzana, Calif.

Filed Oct. 29, 1958, Ser. No. 770,341
14 Claims. (Cl. 331—50)

This invention relates to vibrato circuits suitable for use with electrical signals in the audio range and is particularly adapted for use in the musical field. The vibrato circuit of the present invention is an improvement on that shown in my copending application entited "Electrical Vibrato and Tremolo Devices," Serial No. 414,589 filed March 8, 1954.

This earlier application discloses a number of different circuit arrangements suitable for use in practicing the invention and it is an object of the present invention to provide a particular type of variable impedance which is suitable for use with any of the embodiments of the earlier application.

My vibrato circuit includes a bridge having an input and an output with two impedances connected in series across the input and serving as two arms of the bridge. The incoming signal is coupled across the input of the bridge to develop two signal voltages which are substantially 180° out of phase, which signal voltages are applied across the serially connected impedances to provide the output of the bridge. The magnitude of the impedance of one or both of the serially connected impedances is cyclically changed at the vibrato frequency, resulting in the desired deviation of the frequency of the output from the input. In such circuits, the frequency of the input signal will ordinarily be in the range of 30 to 20,000 cycles per second and the frequency of the vibrato in the order of 1 to 8 cycles per second. The operation of this basic vibrato circuit has been described in detail in my copending application referred to above and this detailed description will not be repeated herein.

It is an object of the invention to provide a vibrato circuit in which nonlinear impedance units are used as the variable impedance of the bridge. Many types of nonlinear impedance units are known in the art, including resistors, capacitors and inductors. A nonlinear unit is one in which the magnitude of the impedance varies as a function of the applied voltage or current. A preferred type of nonlinear impedance unit for use in the present invention is a nonlinear resistor of the type known as varistors, which units are small, inexpensive, easily installed and dependable.

It is an object of the invention to provide a vibrato circuit in which the variable impedance is achieved by use of two or more impedance units which operate in a push-pull type of circuit. A further object is to provide such a vibrato circuit wherein the signal is applied across the nonlinear variable impedance units in parallel and the vibrato control voltage is applied across the units in series. An important advantage gained in this type of circuitry is the substantial reduction of nonlinearities or distortion in the output of the circuit, including cancellation of the even harmonic distortion.

It is another object of the invention to provide a vibrato circuit wherein the control voltage which is introduced into the circuit for varying the impedance of the variable arm of the bridge is eliminated from the output of the circuit. A further object is to provide such a circuit wherein each of the nonlinear impedance units is connected in series with a capacitance selected so that the capacitance will have relatively high impedance at the frequency of the vibrato control voltage and a relatively low impedance at the frequency of the signal, thus providing isolation between the signal and the control circuitry and permitting cancellation of the control voltage from the output of the vibrato circuit, as well as minimizing attenuation of the control voltage.

It is an object of the invention to provide a vibrato circuit using nonlinear impedance units which may be connected in cascade with similar vibrato circuits as desired. A further object is to provide such circuits which can be driven from a single control voltage source. A further object of the invention is to provide such a vibrato circuit which does not require transformers for isolation from the remainder of the equipment. The vibrato circuit of the invention can be treated as a three-terminal circuit with the input connected across input and ground terminals and the output connected across output and ground terminals.

It is an object of the invention to provide a vibrato circuit including a bridge network having an input and an output with two impedances serially connected across the input to form two arms of the network, with one of the impedances including two nonlinear impedance units coupled in parallel, means for coupling a source of signals to the input of the bridge network, and means for connecting a cyclically varying control current through the two impedance units in series. A further object is to provide such a circuit wherein each of the nonlinear impedance units is connected in series with a capacitance to form a series circuit with the two series circuits being connected in parallel to form the variable impedance arm of the bridge network.

It is an object of the invention to provide a vibrato circuit wherein two impedances are serially connected across a source of two signals 180° out of phase with one of the impedances incorporating a push-pull nonlinear type of variable impedance arm. A further object of the invention is to provide an oscillator and phase-splitter suitable for generating the required push-pull control voltage for varying the impedance of one arm of the bridge network.

The invention also comprises novel details of construction and novel combinations and circuit arrangements, together with other objects, advantages, features and results, which will more fully appear in the course of the following description. The drawings merely show and the description merely describes preferred embodiments of the invention which are given by way of illustration or example.

Vibrato is the result of deviation of the frequency of the signal from the mean frequency thereof. In music, vibrato of 5% of mean frequency is common and vibrato for acoustical testing purposes may be much greater. A vibrato rate of 7 cycles per second is typical in the music field. In the circuit of the invention, the desired frequency deviation is produced by introducing phase shift into the electrical signal with the rate of change of phase and the amount of phase shift determining the vibrato produced. The phase shift is obtained by coupling the signal across a network in which the impedance of one or more of the units of the network is cyclically varied with the frequency of impedance change controlling the rate of change of phase and the magnitude of the frequency change controlling the amount of phase shift.

Figure 1:
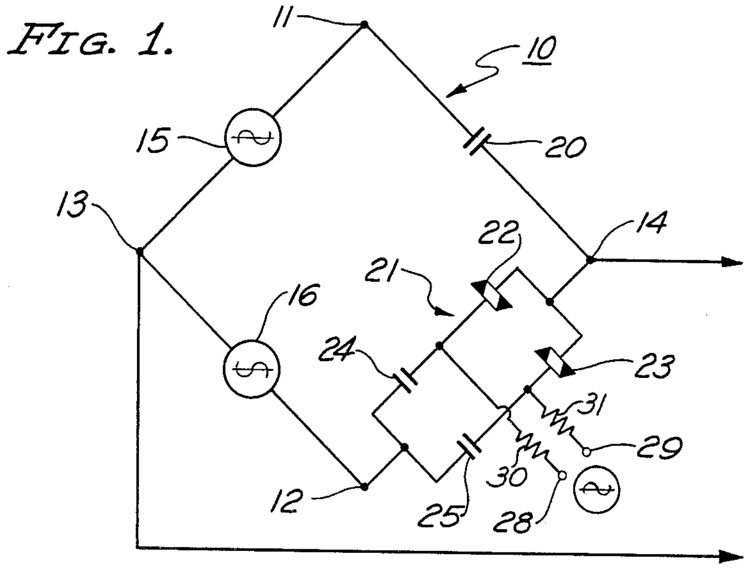
FIG. 1 is a schematic diagram of the vibrato circuit of the invention.

A number of circuits for producing the desired phase shift have been illustrated and described in my previously identified copending application Serial No. 414,589. FIG. 1 of the present application shows a new and improved circuit for producing the desired impedance change and, hence, phase shift in the signal being transmitted. A bridge network 10 has input terminals 11, 12 and output terminals 13, 14. The incoming signal to which the vibrato is to be added is coupled to the input of the network to produce 180° out-of-phase signals across the arms 11—13 and 13—12 of the bridge. This input may be introduced in any desired manner, including the various arrangements shown in the aforesaid copending application. In the circuit of FIG. 1, the input is schematically represented as an alternating signal source 15 between the terminals 11 and 13 and another alternating signal source 16 between the terminals 13 and 12, with the two sources having the same frequency and being 180° out of phase.

The arms 11—14 and 14—12 of the network comprise two impedances connected in series with at least one of the impedances being variable. A preferred form for the arm 11—14 is a single fixed capacitor 20, although an inductor could be used if desired. The single capacitor provides the simplest type of circuit, inductors being more bulky and expensive and providing no D.C. voltage isolation. While both impedances may be varied if desired, it is simpler to keep one arm of the bridge fixed and vary only a single arm.

A variable impedance 21 is connected in the arm 14—12. The variable impedance includes two nonlinear impedance units which are connected in parallel between the terminals 12 and 14. However, these two nonlinear impedance units are connected so that the vibrato control voltage can be applied across them in series so that the control current passes through the two nonlinear impedance units in series while the signal current passes through them along parallel paths. In the preferred embodiment of FIG. 1, nonlinear resistors or varistors 22, 23 comprise the nonlinear impedance units. The nonlinear resistor 22 is connected in series with a capacitor 24 to form a first series unit and the nonlinear resistor 23 is connected in series with a capacitor 25 to form a second series unit. The two series units are then connected in parallel between the terminals 12 and 14.

The junction between the resistor 22 and the capacitor 24 is connected to a vibrato control terminal 28 and the junction between the resistor 23 and the capacitor 25 is connected to another vibrato control terminal 29, preferably through isolation resistors 30, 31, respectively. An alternating voltage varying at the desired vibrato rate and amplitude and balanced with respect to ground—that is, with each terminal maintaining approximately equal instantaneous control voltage amplitude, but opposite polarity—is coupled across the terminals 28, 29 to provide the desired vibrato control current for the resistors 22, 23.

In the operation of the circuits, a decrease in vibrato control current through the resistors 22, 23 causes the impedance of each resistor to increase, resulting in an increase in the impedance of the arm 12—14 of the bridge. Similarly, an increase in control current causes a corresponding decrease in the impedance of each resistor and, hence, a decrease in the impedance of the arm. Hence, it is seen that the present circuit provides an impedance which is variable as a function of a control voltage to produce a phase shift in the incoming signal which is also a function of the control voltage. However, the present circuit provides certain unique advantages which are not achieved in previously known vibrato circuits. In the present circuit, which could be referred to as a push-pull variable impedance circuit, a substantial reduction in nonlinearity or distortion effects is achieved, and there is cancellation of the even harmonic distortion ordinarily occurring in nonlinear elements. This even harmonic cancellation is one of the reasons for referring to the circuit as a push-pull type.

Furthermore, the circuit eliminates the control voltage from the output. The capacitors 24, 25, are preferably selected to have an impedance which is high at the frequency of the control voltage but low at the frequency of the incoming signal. Then these capacitors will not attenuate the signal to which the vibrato is being added but will prevent the control voltage from being short-circuited. Since the nonlinear resistors 22 and 23 are connected at points 28 and 29 to a control voltage that is balanced to ground and since they will have the same instantaneous value, their junction, point 14, which is the output terminal of the bridge, is a neutral point with respect to the control voltage, eliminating "thump" or control voltage pulsations in the output.

Another important feature of the circuit of he invention is that the circuit may be treated as a three terminal network and may be connected directly into other equipment without requiring isolating transformers, or the like. Examples of other nonlinear impedance units which are suitable for use besides the varistors discussed above are nonlinear ceramic capacitors, saturable-core inductors, vacuum tubes, especially diodes, gas tubes, such as small neon indicators, and semi-conductor diodes.

Figure 2:
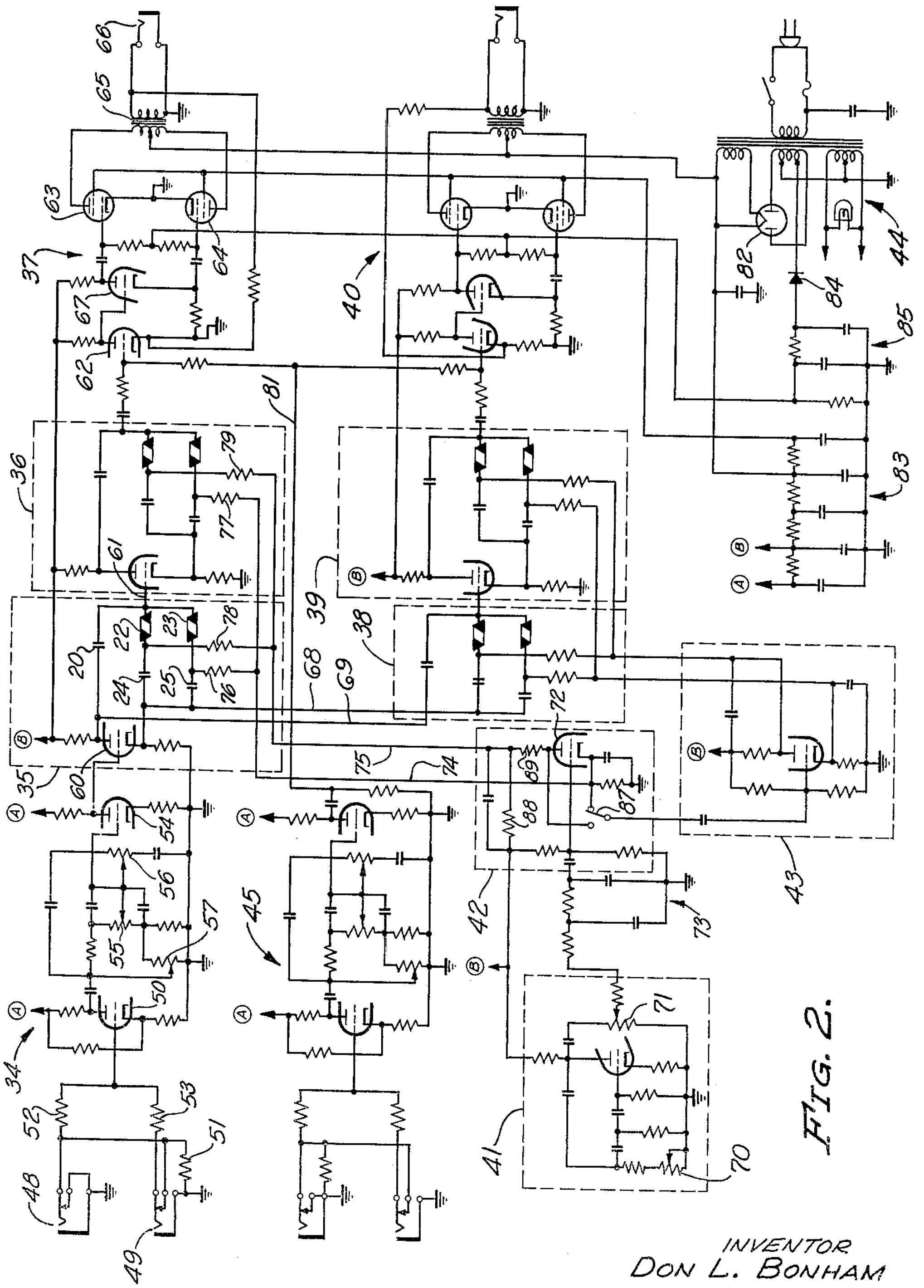
FIG. 2 is a schematic diagram of a musical instrument amplifier incorporating the vibrato circuit of the invention.

FIG. 2 shows an amplifier suitable for use with an electrical musical instrument or the like, which amplifier includes a preferred form of vibrato circuit of the invention. An important feature of the instrument of FIG. 2 is the connection of two stages of vibrato in cascade to provide twice the vibrato produced by one stage. One bridge stage produces a pleasant but rather mild effect. The effect produced is proportional to the number of stages employed. Three stages are often used for theatrical organs to obtain heavy vibrato.

The amplifier of FIG. 2 includes two output channels which will be referred to as channel A and channel B. The incoming signal to which the vibrato is to be applied passes successively through an input amplifier 34, a first vibrato stage 35, a second vibrato stage 36, and an output amplifier 37, the vibrato stages 35, 36 and the output amplifier 37 comprising channel A. Channel B, which includes a first vibrato stage 38, a second vibrato stage 39, and an output amplifier 40, is coupled in parallel with channel A. The control voltage for the vibrato stages is provided by an oscillator 41 through phase splitters 42 and 43, which are connected to the vibrato stages of channels A and B, respectively. A rectifier section 44 provides direct current power for operating the amplifier from an A.C. line and an input amplifier 45 provides for handling signals when it is desired to bypass the vibrato stages.

The input amplifier 34 includes input jacks 48 and 49 for coupling an incoming signal to the control grid of an amplifier tube 50, which tube is operated as a conventional class A amplifier. The two input jacks are coupled in parallel to the grid of the tube 50 but provide for different impedances to ground. For example, a resistor 51 can have a high impedance, such as about 5 megohms, while resistors 52, 53 have a low impedance, such as 50,000 ohms, so that a signal source coupled to the jack 48 will see a high impedance to ground while a signal source coupled to the jack 49 will see a low impedance. The output of the amplifier tube 50 is connected as the input to another amplifier tube 54 through a tone control circuit which includes a bass control potentiometer 55, a treble control potentiometer 56, and a volume control potentiometer 57. The tube 54 is also operated as a conventional class A amplifier. While the input amplifier 34 is preferred for operating with the invention, the details thereof are not considered novel features of the present invention. The input amplifier 45 may be identical to the amplifier 34 and will not be described in detail.

The vibrato stage 35 is basically the same as the circuit of FIG. 1 and identical elements are identified by the same reference numerals. The output from the amplifier 34 is connected to the control grid of a tube 60 which is operated as a phase splitter to produce voltages at its plate and cathode corresponding to the incoming signal voltage, which cathode and plate voltages are 180° out of phase with each other. Hence, the phase-splitter circuit including the tube 60 corresponds to the sources 15 and 16 of the circuit of FIG. 1. The output of the vibrato stage 35 appears on line 61 and is connected as the input to the vibrato stage 36 which is identical in construction and operation to the stage 35.

The output amplifier 37 includes a voltage amplification stage with a tube 62, a push-pull power amplification stage with tubes 63, 64, an output transformer 65 and an output jack 66. The output from the second vibrato stage 36 is coupled as the input to the tube 62 and a phase splitter utilizing a tube 67 provides the drive for the push-pull power amplifier from the voltage amplifier. While a preferred form for the output amplifier is shown herein, the details of this circuit are not considered a novel feature of the invention and, as in connection with the input amplifier, various amplifier circuits may be used. The output amplifier 40 is identical to the amplifier 37 and will not be described in detail.

Turning now to the first vibrato stage 38 of channel B, the phase-splitting circuit, including the tube 60, of the vibrato stage 35 also provides the input signal for the stage 38 through lines 68, 69. The vibrato stage 38 is otherwise identical to the stage 35 and the stage 39 is also identical to the stage 35.

The oscillator 41 is shown as a conventional RC oscillator having a potentiometer 70 for varying the oscillation frequency and thereby the vibrato rate, and a potentiometer 71 for controlling the magniture of the oscillator output which is coupled to the phase splitters and, hence, the vibrato magnitude. The vibrato control voltage is coupled from the arm of the potentiometer 71 of the oscillator 41 to the control grid of a tube 72 of the phase splitter 42 through a low pass filter 73 which eliminates harmonics and switching transients from the control voltage. The tube 72 is operated as a conventional phase splitter producing an alternating voltage across lines 74, 75 at the frequency of the vibrato oscillator. The line 74 is connected to the junction between the resistor 23 and the capacitor 25 of the vibrato stage 35 through a resistor 76 and to the corresponding junction of the stage 36 through another resistor 77. The line 75 is similarly coupled to the junction between the resistor 22 and the capacitor 24 of the stage 35 through a resistor 78 and to the corresponding junction of the stage 36 through a resistor 79. The resistors 76–79 serve to isolate each of the vibrato stages from the other and from the phase splitter so that the nonlinear resistors 22, 23 of each stage float relative to circuit ground. This type of connection permits a plurality of vibrato stages to be operated in cascade or in parallel from a single oscillator and phase splitter.

The lines 74, 75 could be similarly connected to the stages 38 and 39 to supply the required control voltages. However, a preferred form of operation is shown in FIG. 2 wherein a second phase splitter 43 is used to drive the vibrato circuits of channel B. The phase splitter 43 is identical to the phase splitter 42 and is connected to the corresponding vibrato stages in the same manner, with the following exception. The input to the phase splitter 43 is taken from the moving contact of a switch 87 with the fixed contacts of the switch being connected to the plate and cathode, respectively, of the tube 72 of the phase splitter 42. This permits the inputs to the phase splitter 43 to be either in phase with the input to the phase splitter 42 or 180° out of phase which, in turn, permits the vibrato stages of channel B to be operated either in phase or 180° out of phase with the vibrato stages of channel A. The plate load of the tube 72 consists of two resistors 88, 89, with the resistance of 89 being small relative to the resistance of 88, to equalize operating levels in the two phase splitters. It should be noted that while a preferred circuit for supplying the control current to the vibrato stages is shown in FIG. 2, other types of phase splitters, such as transformers, may be utilized, or a push-pull oscillator output may be directly connected to the stages if desired.

Referring to the input amplifier 45, its output is connected via line 81 to the inputs of the output amplifiers 37 and 40, bypassing the vibrato stages of both channels. This auxiliary input permits the circuit of FIG. 2 to be used as a conventional amplifier without introducing vibrato when desired.

The rectifier section 44 may be a conventional circuit and is shown utilizing a full wave rectifier tube 82 and a multistage RC filter 83 to provide the necessary positive D.C. voltages for operating the various amplifiers and phase splitters. A negative power supply, including a diode rectifier 84 and another RC filter 85, provides a bias voltage for the push-pull amplification states of the output amplifiers 37 and 40.

Figure 3:
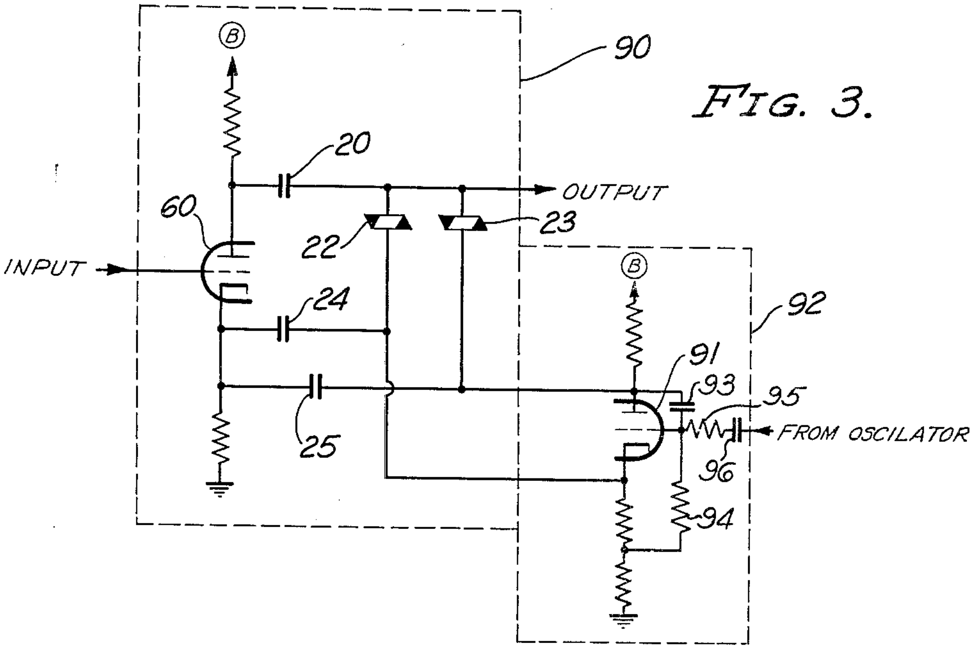
FIG. 3 is a schematic diagram of an alternative form of the invention.

An alternative form of the vibrato circuit of the invention is shown in FIG. 3. A single vibrato stage 90, similar to the stage 35 of FIG. 2, is utilized, with corresponding elements being identified by the same reference numerals. The control grid of a tube 91 of a phase splitter 92 is driven from the vibrato oscillator or other source of the control voltage, preferably through a resistor 95 and a capacitor 96. The cathode and plate of the tube 91 are directly connected to the nonlinear resistors 22, 23, respectively, so that the phase splitter as well as the nonlinear resistors of the vibrato stage float relative to circuit ground. A capacitor 93 is connected between plate and grid and prevents the tube 91 from amplifying signal voltages. In performs the same as if it bypassed grid to cathode, but the plate-grid connection permits a smaller value of capacitance. A resistor 94 is connected between grid and cathode and establishes D.C. bias.

Thus it is seen that the unique variable impedance units of the vibrato circuit of the invention provide a simpler, more reliable and less expensive instrument than previously known equipment while, at the same time, reducing distortion and improving linearity of response. Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a vibrato circuit, the combination of: a bridge network having an input and an output, said bridge network including a capacitance and an impedance serially connected across said input comprising two arms of said bridge network, with the junction of said capacitance and impedance comprising one terminal of said output; and with said impedance including two varistors coupled in parallel; means for coupling a source of signals to said input of said bridge network; and means for connecting a cyclically varying control current through said two varistors in series.

2. In a vibrato circuit, the combination of: a bridge network having an input and an output, said bridge network including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear impedance element connected in series, with said nonlinear elements at corresponding ends of the circuit units; means for coupling a source of signals to said input of said bridge network; and means for connecting a cyclically varying control current through said two elements in series, with the impedance of each of said capacitances relatively low at the frequency of said signals and relatively high at the frequency of said control current.

3. In a vibrato circuit, the combination of: a source of two signals 180° out of phase; two impedances serially connected across said source with the junction of said impedances comprising an output of the vibrato circuit, one of said impedances including two circuits units coupled in parallel, each of said circuit units comprising a capacitance and a nonlinear resistance connected in series, with said resistances at corresponding ends of said circuit units; and means for connecting a cyclically varying control current through said two resistances in series, with the impedance of each of said capacitances relatively low at the frequency of said signals and relatively high at the frequency of said control current.

4. In a vibrato circuit, the combination of: a bridge network having an input and an output, said bridge network including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear impedance element connected in series at a junction, with said nonlinear elements at corresponding ends of said circuit units; means for coupling a source of signals to said input of said bridge network; a two-terminal source for producing a cyclically varying control voltage of push-pull form; means for connecting one of said source terminals to said junction of one of said circuit units; and means for connecting the other of said source terminals to said junction of the other of said circuit units, with the impedance of each of said capacitances relatively low at the frequency of said signals and relatively high at the frequency of said control voltage.

5. In a vibrato circuit, the combination of: a bridge network having an input and an output, said bridge network including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear impedance element connected in series at a junction, with said nonlinear elements at corresponding ends of said circuit units; means for coupling a source of signals to said input of said bridge network; an oscillator for producing a cyclically varying output; a phase-splitting circuit having said oscillator output as an input and producing a push-pull varying control voltage; and means for coupling said push-pull voltage across said junctions of said circuit units.

6. In a vibrato circuit, the combination of: two bridge networks connected in cascade, each of said networks having an input and an output with the output of the first network coupled to the input of the second network, each of said bridge networks including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear impedance element connected in series, with said nonlinear elements at corresponding ends of said circuit units; means for coupling a source of signals to said input of said first bridge network; means for connecting a cyclically varying control current through said two impedance elements of said first bridge network in series; and means for connecting said cyclically varying control current through said two impedance elements of said second bridge network in series, with the impedance of each of said capacitances relatively low at the frequency of said signals and relatively high at the frequency of said control current.

7. In a vibrato circuit, the combination of: two bridge networks connected in cascade, each of said networks having an input and an output with the output of the first network coupled to the input of the second network, each of said bridge networks including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear resistance connected in series, with said nonlinear resistances at corresponding ends of the circuit units; means for coupling a source of signals to said input of said first bridge network; and means for connecting a cyclically varying control voltage across said two resistances of said first bridge network and across said two resistances of said second bridge network.

8. In a vibrato circuit, the combination of: two bridge networks connected in cascade, each of said networks having an input and an output with the output of the first network coupled to the input of the second network, each of said bridge networks including two impedances serially connected across said input, with said impedances comprising two arms of said bridge network and with the junction of said impedances comprising one terminal of said output, one of said impedances including two circuit units coupled in parallel, each of said circuit units comprising a capacitance and a nonlinear impedance element connected in series at a junction, with said nonlinear elements at corresponding ends of the circuit units; means for coupling a source of signals to said input of said first bridge network; an oscillator for producing a cyclically varying output; a phase-splitting circuit having said oscillator output as an input and producing a push-pull varying control voltage across first and second terminals; a first resistor connected between said first terminal and the junction of one of said circuit units of said first bridge network; a second resistor connected between said second terminal and the junction of the other of said circuit units of said first bridge network; a third resistor connected between said first terminal and the junction of one of said circuit units of said second bridge network; and a fourth resistor connected between said second terminal and the junction of the other of said circuit units of said second bridge network, with the impedance of each of said capacitances relatively low at the frequency of said signals and relatively high at the frequency of said control voltage.

9. In a vibrato circuit, the combination of: a source of two signals 180° out of phase; a first set of two impedances serially connected across said source; a second set of two impedances serially connected across said source, with one of said impedances of each of said sets including two circuit units coupled in parallel, each of said circuit units comprising a capacitance and a nonlinear impedance element connected in series, with said nonlinear elements at corresponding ends of said circuit units; means for connecting a cyclically varying control current in series through the two nonlinear elements of said first set; and means for connecting a cyclically varying control current in series through the two nonlinear elements of said second set, with the impedance of each of said capacitances relatively low at the frequency of said signals and relatively high at the frequency of said control current.

10. In a vibrato circuit for introducing a relatively low frequency cyclical phase shift into a relatively high frequency signal, the combination of: a bridge network having an input and an output, said bridge network including two impedances serially connected across said input, with said impedances comprising two arms of said bridge network and with the junction of said impedances comprising one terminal of said output, one of said impedances including two nonlinear impedance units coupled in parallel and providing continuous signal transmission through said one impedance; means for coupling a source of signals to said input of said bridge network; and means for connecting through said two units in series a control current cyclically varying at the vibrato frequency whereby the signals coupled to said bridge network input appear at said bridge network output with a low frequency cyclical phase shift.

11. In a vibrato circuit, the combination of: a bridge nework having an input and an output, said bridge network including two impedances serially connected across said input, with said impedances comprising two arms of said bridge network and with the junction of said impedances comprising one terminal of said output, one of said impedances including two circuit units coupled in parallel, each of said circuit units comprising a first impedance element and a second impedance element connected in series at a junction, with each of said second elements being nonlinear, and with said nonlinear elements at corresponding ends of said circuit units; means for coupling a source of signals to said input of said bridge network; a two-terminal source for producing a cyclically varying control voltage; means for connecting one of said source terminals to said junction of one of said circuit units; means for connecting the other of said source terminals to said junction of the other of said circuit units, with the impedance of each of said first impedance elements relatively low at the frequency of said signals and relatively high at the frequency of said control voltage.

12. In a vibrato circuit, the combination of: two bridge networks connected in cascade, each of said networks having an input and an output with the output of the first network coupled to the input of the second network, each of said bridge networks including two impedances serially connected across said input, with said impedances comprising two arms of said bridge network and with the junction of said impedances comprising one terminal of said output, one of said impedances including two nonlinear impedance units coupled in parallel; means for coupling a source of signals to said input of said first bridge network; means for connecting a cyclically varying control current through said two impedance units of said first bridge network in series; and means for connecting said cyclically varying control current through said two impedance units of said second bridge network in series.

13. In a vibrato circuit, the combination of: a source of two signals 180° out of phase; a first set of two impedances serially connected across said source; a second set of two impedances serially connected across said source, with one of said impedances of each of said sets including two nonlinear impedance units coupled in parallel; means for connecting a first cyclically varying control current in series through the two nonlinear units of said first set; and means for connecting a second cyclically varying control current in series through the two nonlinear units of said second set, with said first and second control currents of the same frequency and substantially 180° out of phase.

14. In a vibrato circuit, the combination of: a signal source of two signals 180° out of phase; a first set of two impedances serially connected across said signal source; a second set of two impedances serially connected across said signal source, with one of said impedances of each of said sets including two nonlinear impedance units coupled in parallel; a control source of two cyclically varying control voltages of the same frequency and substantially 180° out of phase; means for connecting a control current in phase with one of said control voltages in series through the two nonlinear units of said first set; and means for selectively connecting a control current in phase with either of said control voltages in series through the two nonlinear elements of said second set.

References Cited in the file of this patent

UNITED STATES PATENTS

| | | |
|---|---|---|
| 2,191,315 | Guanella | Feb. 20, 1940 |
| 2,205,843 | Caruthers | June 25, 1940 |
| 2,242,791 | Ohl | May 20, 1941 |
| 2,470,893 | Hepp | May 24, 1949 |
| 2,695,988 | Gray | Nov. 30, 1954 |